(No Model.)
J. J. HENRY.
CAR BRAKE.
No. 315,780. Patented Apr. 14, 1885.
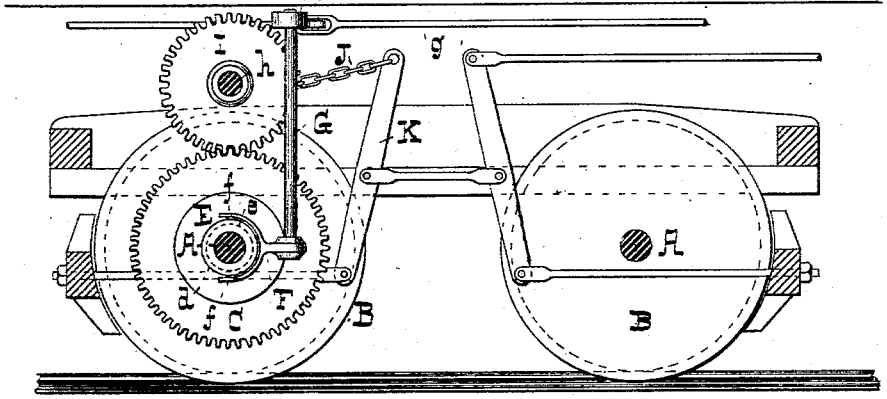
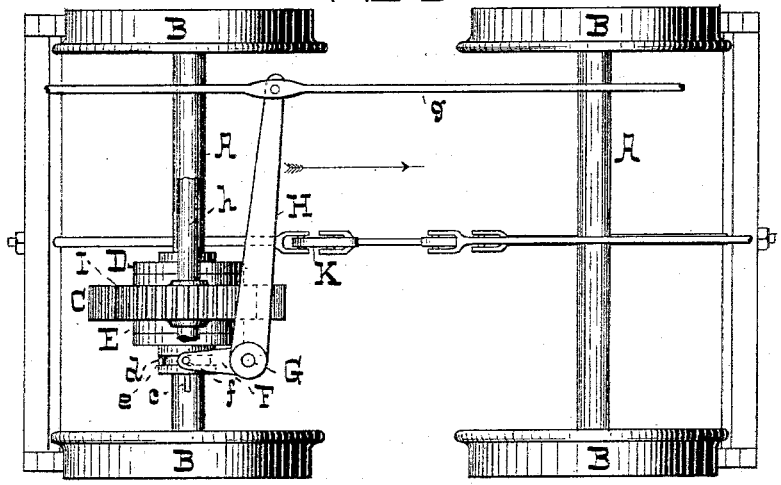
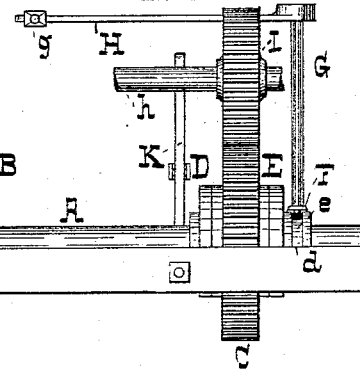
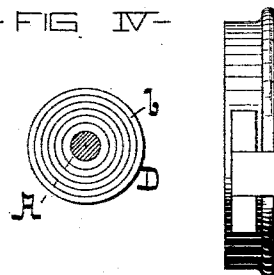
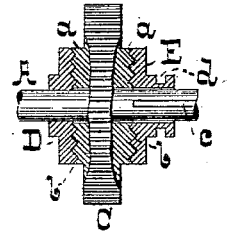
WITNESSES
Danl Fisher
Charles W Arnold
INVENTOR
John Joseph Henry
by G. H. & W. T. Howard
Attys

UNITED STATES PATENT OFFICE.

JOHN JOSEPH HENRY, OF BALTIMORE, MARYLAND, ASSIGNOR OF ONE-HALF TO GEORGE ALEXANDER SCHAAL, OF SAME PLACE.

CAR-BRAKE.

SPECIFICATION forming part of Letters Patent No. 315,780, dated April 14, 1885.

Application filed October 23, 1884. (No model.)

*To all whom it may concern:*

Be it known that I, JOHN JOSEPH HENRY, of the city of Baltimore and State of Maryland, have invented certain Improvements in Car-Brakes, of which the following is a specification.

In the accompanying drawings, forming a part hereof, Figure I is a longitudinal section of a car-truck provided with my improvements. Fig. II is a plan of Fig. I with the frame of the truck removed. Fig. III is an end view of Fig. II. Figs. IV and V are details of the brake, as hereinafter described.

A A are the axles, and B B the wheels, of the truck. One of the axles A is provided with a gear-wheel, C, in which it revolves loosely. The faces of the hub of the gear-wheel C are provided with concentric annular V-shaped projections $a$, adapted to engage with similar ones, $b$, on the faces of the clutches D and E. The clutch D is permanently fastened to the axle, while the one E rests on a feather, $c$, and is adapted to slide longitudinally of the axle. The clutch E has a groove, $d$, in its hub, in which a ring, $e$, having trunnions $f$, rests.

F is a forked arm on a vertical shaft, G, the ends of which arm are connected to the trunnions $f$. The upper end of the vertical shaft G has a lever, H, which is attached to a rod, $g$, extending the whole length of the car, and is adapted for connection to similar rods on the adjoining cars, so as to form a continuous brake-rod, which may be operated from the engine in any suitable manner. The supports for the vertical shaft G are not shown, as their illustration would tend to complicate the drawings. When the lever H is moved by means of the rod $g$ in the direction of the arrow, the clutch E, which is constantly in revolution, in common with the axle, is forced against the grooved face of the gear-wheel C, and the wheel C is driven closely in contact with the fixed clutch D. By this means, when the movable clutch E is applied, the wheel C is held between two revolving surfaces and partakes of their movement.

I is another gear-wheel, which is fastened to a shaft, $h$, and is interlocked with the one C.

J is a chain, one end of which is secured to the shaft $h$ and the other to the brake-lever K, which is a part of a system of brake mechanism.

I do not limit myself to any peculiar arrangement of brake-levers, as the chain J can connect to any of the levers now in use.

The principal object in using friction-clutches is to prevent dangerous strain being placed on the brake mechanism, as would be the case if the ordinary positive clutch were employed.

It will be understood that the sizes of the gear-wheels and the proportions of the levers can be arranged to produce, with a given force at the engine, any desired tension of the brake-shoes on the wheels.

I claim as my invention—

In a car-brake, the axle having a loose gear, with its hubs provided with concentric annular V-shaped projections, combined with a fixed and a movable clutch on its axle, having similar projections, a gear fastened on an independent shaft interlocked with the first gear, a winding-chain which leads from the said independent shaft to a lever of any ordinary brake mechanism, and devices to operate the movable clutch, substantially as specified.

J. JOS. HENRY.

Witnesses:
WM. T. HOWARD,
CHARLES W. ARNOLD.